United States Patent [19]

Hwang et al.

[11] Patent Number: 5,604,687
[45] Date of Patent: Feb. 18, 1997

[54] THERMAL ANALYSIS SYSTEM AND METHOD OF OPERATION

[75] Inventors: Ming J. Hwang, Richardson; Darvin R. Edwards, Garland, both of Tex.

[73] Assignee: Texas Instruments Incorporated, Dallas, Tex.

[21] Appl. No.: 189,401

[22] Filed: Jan. 31, 1994

[51] Int. Cl.$^6$ ................................................. G06F 19/00
[52] U.S. Cl. ................................. 364/578; 364/557
[58] Field of Search ............................. 364/557, 578, 364/488–491, 806

[56] References Cited

U.S. PATENT DOCUMENTS

| | | | |
|---|---|---|---|
| 3,683,417 | 8/1972 | Gummel | 364/488 |
| 4,742,473 | 5/1988 | Shugar et al. | 364/578 |
| 5,148,379 | 4/1992 | Konno et al. | 364/578 |
| 5,202,843 | 4/1993 | Kunimine et al. | 364/578 |
| 5,369,594 | 11/1994 | Huang et al. | 364/489 |

OTHER PUBLICATIONS

Jones, G. R. et al., *Electrical Engineer's Reference Book*, 15th Ed., Butterworth–Heinemann Lmt., Oxford, 1993, p. 4/30.

Sokolnikoff, I. S. et al., *Mathematics of Physics and Modern Engineering*, McGraw–Hill Book Co., Inc, N.Y., 1958, pp. 689–690.

Chang, N. et al., "IPDA: Interconnect Performance Design Assistant," *Design Automation Conference*, 1992, pp. 472–477.

Pulko, S. H. et al., "Computer–aided thermal management of electronic networks and devices using TLM," *Computer Aided Engineering Journal*, vol. 8 No. 3, Jun. 91, pp. 91–96.

Godfrey, W. et al., "Interactive thermal modeling of electronic circuit boards," *IEEE Transactions on Components, Hybrids and Manufacturing*, vol. 16 No. 8, Dec. 1993, pp. 978–985.

Naoueralski, A. et al., "A comparative shady on two simulation methods for thermal analysis of power electronic devices," *Computers in Power Electronics*, 1992 workshop, pp. 129–142.

Haskew, T. A. et al., "An algorithm for steady–state thermal analysis of electrical cables with radiation by reduced Newton–Raphson techniues," *IEEE Transaction on Power Delivery*, vol. 9 No. 1, Jan. 1994, pp. 526–533.

*Primary Examiner*—James P. Trammell
*Assistant Examiner*—Kyle T. Choi
*Attorney, Agent, or Firm*—W. Daniel Swayze, Jr.; W. James Brady, III; Richard L. Donaldson

[57] ABSTRACT

A thermal analysis system (10) for analyzing a thermal model of an object is provided which comprises a Gauss-Seidel processor (12) that includes an acceleration factor generator (14). An initial condition generator (16) and a residual energy feedback accelerator (18) are coupled to the Gauss-Seidel processor (12). A data storage (20) is coupled to the Gauss-Seidel processor (12), and a display (22) is coupled to the data storage (20).

14 Claims, 2 Drawing Sheets 5,604,687

THERMAL ANALYSIS SYSTEM AND METHOD OF OPERATION

TECHNICAL FIELD OF THE INVENTION

This invention relates in general to the field of electronic systems and more particularly to an improved thermal analysis system and method of operation.

BACKGROUND OF THE INVENTION

It is useful to analyze the thermal characteristics of an object by creating a thermal model of the object and analyzing the model. A thermal model of an object is a model that represents the heat conduction characteristics of the material of which the object is composed.

Thermal analysis systems that analyze the thermal characteristics of a thermal model of an object are used in the design and manufacture of integrated circuit packages. Higher concentrations of components in integrated circuits and faster clock speeds have resulted in higher power consumption across a broad range of integrated circuit products. It is important that an integrated circuit package exhibit thermal performance capable of managing the thermal heat generated by the integrated circuit. To design packages more efficiently, thermal analysis systems are used to predict the thermal characteristics of a particular integrated circuit package design.

An analysis of a thermal model can be a steady state or a transient analysis. A steady state analysis of a thermal model produces a result that predicts the temperature to which the thermal model would settle given infinite power on time. A transient analysis of a thermal model begins with a specific temperature for the thermal model and predicts the temperature of the thermal model after a specified time period.

One type of thermal model of an object is a resistor network thermal model. A resistor network thermal model represents an object as a number of nodes separated by a number of resistors. The object to be modeled is divided into a number of elemental volumes often chosen to be cubes. Each node in the resistor network thermal model is centered in one of the elemental volumes subdividing the object. The resistors connecting the nodes represent the heat conduction characteristics of the physical material between each node. The resistors represent the total thermal conduction between nodes including convection boundaries, internal conduction, and radiation. A resistor network thermal model is useful for calculating a numerical solution that takes into account property variations in the materials from which the modeled object is composed. A resistor network thermal model is particularly useful for numerical solution of complicated three dimensional models. A network thermal model can also be considered a conduction node thermal model when the conductances are specified rather than resistances.

SUMMARY OF THE INVENTION

A need has arisen for an improved thermal analysis system for analyzing a thermal model of an object and method of operation.

In accordance with the present invention, an improved thermal analysis system and method of operation is provided that substantially eliminates or reduces the disadvantages and problems associated with prior thermal analysis systems.

According to one embodiment of the present invention, a thermal analysis system for analyzing a thermal model of an object is provided which comprises a Gauss-Seidel processor. The Gauss-Seidel processor is operable to analyze a resistor network thermal model of an object by performing a Gauss-Seidel iteration analysis. The Gauss-Seidel processor uses an acceleration factor and performs a plurality of iterations to transform a first set of data defining a first plurality of temperatures for a plurality of nodes in the resistor network thermal model into a second set of data defining a second plurality of temperatures for the plurality of nodes. The thermal analysis system also comprises an acceleration factor generator coupled to the Gauss-Seidel processor. The acceleration factor generator is operable to generate a value for the acceleration factor for each iteration performed by the Gauss-Seidel processor and to provide the value for the acceleration factor to the Gauss-Seidel processor. The value generated for the acceleration factor varies between a lower-value and an upper-value responsive to a number of iterations performed by the Gauss-Seidel processor.

BRIEF DESCRIPTION OF THE DRAWINGS

A more complete understanding of the present invention may be acquired by referring to the following description taken in conjunction with the accompanying drawings in which like reference numbers indicate like features and wherein.

DETAILED DESCRIPTION OF THE INVENTION

Figure 1:
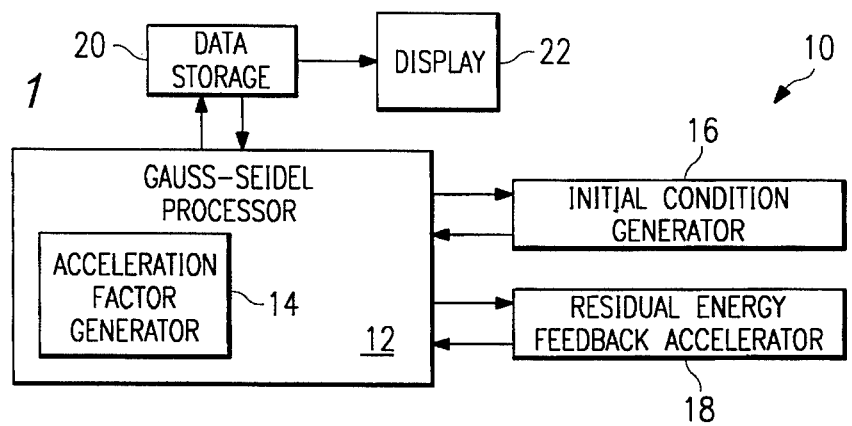
FIG. 1 illustrates a block diagram of a thermal analysis system constructed according to the teachings of the present invention.

A resistor network thermal model of an object is analogous to an electronic circuit where: temperature in the thermal model is analogous to voltage in the electronic circuit, heat in the thermal model is analogous to current in the electronic circuit, and thermal resistance or conductivity is analogous to resistance or conductance in the electronic circuit. The thermal characteristics of the material separating each node can be modeled as a thermal resistance or conductance in the same manner that resistors in an electronic circuit can be defined as resistances or conductances. A resistor network thermal model includes a number of nodes depending upon the size of the object and the size of the elemental volumes subdividing the object. Typically, a resistor network thermal model of an integrated circuit package includes a large number of elemental volumes and consequently a large number of nodes. When a thermal model includes a large number of nodes, an iterative numerical technique frequently may yield an efficient analysis of the model. One iterative numerical technique for analyzing a resistor network thermal model is a Gauss-Seidel iteration analysis.

A Gauss-Seidel iteration analysis includes a number of iterations during which the temperature of each node in a resistor network thermal model is calculated. The temperature of a node is calculated using the conductances or resistances between the node and all adjoining nodes and using the temperatures of the adjoining nodes. The total heat energy and the temperature of each node in a resistor network thermal model is defined by the following equations.

$$Q_{TOTAL} = \sum_{i=1}^{N} Q_i \quad (1)$$

$$Q_i = C_{i1}(T_i - T_1) + C_{i2}(T_i - T_2) + \ldots C_{ij}(T_i - T_j) = \sum_{n=1}^{j} C_{in}(T_i - T_n) \quad (2)$$

$$C_{ij} = \frac{1}{R_{ij}} \quad (3)$$

$$T_i = \frac{Q_i + \sum_{n=1}^{j} C_{in}T_n}{\sum_{n=1}^{j} C_{in}} \quad (4)$$

where, $Q_{TOTAL}$=the total heat energy of the model;

$Q_i$=the heat energy of one node, node i, in the model;

$T_i$=the temperature of node i;

$R_{ij}$=Thermal Resistance from node i to node j;

$C_{i1}$, $C_{i2}$. . . $C_{ij}$=the conductances between node i and adjacent nodes, node 1 to node j; and $T_1$, $T_2$. . . $T_j$=the temperatures of the adjacent nodes, node 1 to node j.

The total heat energy of the thermal model can be defined as a boundary condition as can the power dissipation of the model. With such boundary conditions defined and using the above equations, a Gauss-Seidel iteration analysis of a resistor network thermal model can be performed to predict the steady state temperature of each node. A Gauss-Seidel iteration analysis also can be performed to predict the final temperature of each node in the thermal model given an initial temperature in a transient analysis.

A Gauss-Seidel iteration analysis uses the above equations to iteratively calculate the temperature at each node in the thermal model. An initial set of values for the temperature at every node in the thermal model is selected. This initial set of values for the temperature $T_i$ of each node can be arbitrarily assigned. For a thermal model with a large number of nodes, the initial temperatures frequently are assigned a value equal to zero or the ambient temperature to begin the analysis. Next, new values for the node temperatures $T_i$ are calculated according to equation (4) always using the most recent values of the temperatures at the adjacent nodes, node 1 to node j. The process is repeated until successive iterations predict node temperatures that differ by a sufficiently small amount.

Typically, a Gauss-Seidel iteration analysis is terminated when the values calculated for the temperatures at each node differ by less than a specified number from one iteration to the next. The analysis is terminated and the last node temperatures are used as results when the following occurs:

$$|T_{i_{n+1}} - T_{i_n}| \leq \delta \text{ for all } T_i; \text{ or} \quad (5)$$

$$\left| \frac{T_{i_{n+1}} - T_{i_n}}{T_{i_n}} \right| \leq \epsilon \text{ for all } T_i \quad (6)$$

where, $\delta$=a selected constant;

$\epsilon$=a selected constant; and n=the number of iterations performed in the Gauss-Seidel iteration analysis.

When either of the above conditions occur, the Gauss-Seidel iteration analysis has reached a convergent solution. The smaller the value of $\delta$ or $\epsilon$, the greater the number of iterations and the greater the calculation time required to obtain a convergent solution. The accuracy of the results with respect to the actual physical object that is modeled is not dependent upon the value of $\delta$ or $\epsilon$ alone. These constants govern the accuracy of the results only with respect to the thermal model. The accuracy of the results with respect to the actual physical object also depends upon the size of the elemental volumes. The smaller the elemental volumes the longer the analysis time required but the more accurately the model represents the object.

A thermal analysis system constructed according to the teachings of the present invention utilizes Gauss-Seidel iteration analysis to predict the thermal characteristics of an object by analyzing a resistor network thermal model of the object. The analysis can be a steady state analysis that predicts the temperature at each node given constant boundary conditions. The analysis can also be a transient analysis that predicts the temperature at each node given an initial temperature at each node and a specified period of time during which heat is conducted between the nodes. A technical advantage of the present invention is a large decrease in the number of iterations required to complete the Gauss-Seidel iteration analysis.

FIG. 1 illustrates a thermal analysis system, indicated generally at 10, constructed according to the teachings of the present invention. The thermal analysis system 10 comprises a Gauss-Seidel processor 12 that includes an acceleration factor generator 14. The Gauss-Seidel processor 12 comprises three inputs and three outputs. An initial condition generator 16 comprises an input coupled to one output of the Gauss-Seidel processor 12 and comprises an output coupled to one input of the Gauss-Seidel processor 12. A residual energy feedback accelerator 18 comprises an input coupled to a second output of the Gauss-Seidel processor 12 and comprises an output coupled to a second input of the Gauss-Seidel processor 12. A data storage system 20 comprises one input and two outputs. The input of the data storage system 20 is coupled to the third output of the Gauss-Seidel processor 12, and one output of the data storage system 20 is coupled to the third input of the Gauss-Seidel processor 12. A display 22 comprises an input coupled to the second output of the data storage system 20.

In operation, the thermal analysis system 10 analyses a thermal model of an object and predicts the thermal characteristics of the object based upon the model. The data storage system 20 operates to store data that describes a resistor network thermal model. The data storage system 20 provides the resistor network thermal model to the Gauss-Seidel processor 12. The Gauss-Seidel processor 12 operates to perform a Gauss-Seidel iteration analysis of the resistor network thermal model that includes an acceleration factor. The Gauss-Seidel processor 12 uses the acceleration factor to overcorrect the value of $T_i$ at each new iteration of the Gauss-Seidel iteration analysis, thus anticipating future corrections. The acceleration factor operates as shown in the following equation.

$$T_i^{(n+1)} = T_i^{(n)} + \beta(T_i^{(new)} - T_i^{(n)}) \quad (7)$$

where, n=the n'th iteration in a Gauss-Seidel iteration analysis;

$T_i^{(n)}$=the temperature of node i at the n'th iteration;

$T_i^{(n+1)}$=the setting for the temperature of node i for the (N+1)'th iteration $T_i^{(new)}$=the new temperature for node i to which node i would be set for the (n+1)'th iteration were an acceleration factor not used; and β=the acceleration factor.

The acceleration factor β can range between zero and two. If the acceleration factor is between zero and one, the analysis is under-relaxed. If the acceleration factor is between one and two, the analysis is over-relaxed and the method is called simultaneous over-relaxation (SOR). One method for generating the acceleration factor β is Chebyshev acceleration. With Chebyshev acceleration, the value for the acceleration factor β is generated such that it decreases exponentially with each iteration.

The acceleration factor generator 14 operates to generate a value for the acceleration factor and to provide the value for the acceleration factor to the Gauss-Seidel processor 12. The value generated by the acceleration factor generator 14 varies periodically from a lower-value to an upper-value based upon the number of iterations in the Gauss-Seidel iteration analysis performed by the Gauss-Seidel processor 12. In one embodiment of the present invention, the acceleration factor generator 14 generates a value for the acceleration factor according to the following equation.

$$\beta=(0.95)|\cos(K_1(n \bmod K_2))|+1.01 \qquad (8)$$

where, $K_1$=a first empirically derived constant;

$K_2$=a second empirically derived constant;

n=the number of iterations performed in the Gauss-Seidel iteration analysis; and mod=returns the remainder of n divided by $K_2$ in integer division.

In one embodiment of the present invention, the acceleration factor generator 14 utilizes a value of 0.005 for $K_1$, and a value of 628 for $K_2$. These values are used because they were derived empirically to be the most efficient values for Gauss-Seidel iteration analysis of thermal models of integrated circuit packages.

A technical advantage of the present invention is the periodic variation between a lower-value and a upper-value of the acceleration factor generated by the acceleration factor generator 14. A periodic acceleration factor allows a Gauss-Seidel iteration analysis to accelerate rapidly towards the solution when the acceleration factor is near two, and it allows the Gauss-Seidel iteration analysis to relax overshoot errors as the acceleration factor approaches one. The required processing time for a Gauss-Seidel iteration analysis is greatly reduced by the use of a periodic acceleration factor. In the embodiment of the present invention described above, a cosine function is used to generate a periodic acceleration factor. An acceleration factor generator constructed according to the teachings of the present invention can be used to generate an acceleration factor for any Gauss-Seidel based analysis. This technical advantage of the present invention is not limited to a Gauss-Seidel iteration analysis of a thermal model.

The Gauss-Seidel processor 12 is operable to perform a steady state analysis and a transient analysis of a resistor network thermal model provided by the data storage 20. A steady state analysis comprises analyzing the resistor network thermal model to predict a steady state temperature for each node in the resistor network thermal model. A transient analysis of the resistor network thermal model comprises setting a designated initial temperature for each node in the thermal model and predicting the temperature of each node after a specific period of time has elapsed. For a steady state analysis, the Gauss-Seidel processor 12 utilizes the initial condition generator 16 and the residual energy feedback accelerator 18.

The initial condition generator 16 operates to provide an optimal initial condition for a steady state analysis by the Gauss-Seidel processor 12. The initial condition generator 16 operates by performing a limited number of iterations in a Gauss-Seidel iteration analysis of the resistor network thermal model. The initial condition generator 16 begins with a uniform temperature specified for each node in the thermal model. In one embodiment of the present invention, the uniform temperature is set to equal an ambient temperature of twenty five degrees Celsius.

The initial condition generator 16 performs iterations in a Gauss-Seidel iteration analysis until either (1) a predetermined number of tests have been performed or (2) the total residual energy after a test is less than a specified fraction of the total energy in the thermal model. In one embodiment of the present invention, the total energy of the thermal model is one watt and the specified fraction is one-tenth. If the total residual energy after a test is less than one tenth of a watt, the initial condition generator 16 stops and provides the temperature of each node calculated during the last test as the optimal initial condition for the Gauss-Seidel processor 12. In one embodiment of the present invention, the predetermined number of tests is ten. Thus, the initial condition generator 16 stops after ten tests if the total residual energy does not drop below ten percent of the total energy in the model. The initial condition generator 16 operates to provide an initial temperature for each node in the thermal model for a steady state analysis by the Gauss-Seidel processor 12.

A technical advantage of the present invention is the generation of an optimal initial condition for a steady state analysis. The generation of an optimal initial condition provides a decrease in the number of iterations needed for the Gauss-Seidel processor 12 to arrive at a convergent solution.

The residual energy feedback accelerator 18 operates to provide a global temperature delta to the Gauss-Seidel process 12 after the Gauss-Seidel processor 12 has performed a specified number of iterations. In one embodiment of the present invention, the residual energy feedback accelerator 18 measures the total residual energy in the resistor network thermal model after one hundred iterations and after two hundred iterations in the Gauss-Seidel iteration analysis performed by the Gauss-Seidel processor 12. The residual energy feedback accelerator 18 then analyzes the difference between the total residual energy after one hundred iterations and the total residual energy after two hundred iterations to determine a global temperature delta to provide to the Gauss-Seidel processor 12.

The global temperature delta provided by the residual energy feedback accelerator 18 is utilized by the Gauss-Seidel processor 12 which adds the global temperature delta to the temperature of every node in the thermal model. The residual energy feedback accelerator 18 generates the global temperature delta according to the following equation.

$$\Delta T=K(TRE_{200}-TRE_{100})=K(\Delta TRE) \qquad (9)$$

where, $\Delta T$=the global temperature delta;

$TRE_{100}$=the total residual energy after 100 iterations;

$TRE_{200}$=the total residual energy after 200 iterations;

K=an empirically derived constant; and $\Delta TRE$=the difference between $TRE_{200}$ and $TRE_{100}$.

The residual energy feedback accelerator 18 provides the value of the global temperature delta to the Gauss-Seidel processor 12. In one embodiment of the present invention, the value for K is empirically derived to be most efficient when set equal to 0.08. The Gauss-Seidel processor 12 uses the global temperature delta to change the temperatures of all the nodes in the thermal model. Thus, the Gauss-Seidel processor 12 modifies the new temperature for each node in the thermal model on the two hundred first iteration by the global temperature delta.

A technical advantage of the present invention is the use of residual energy feedback acceleration. The global temperature delta provided by residual energy feedback accelerates the operation of the Gauss-Seidel iteration analysis. The use of a global temperature delta accelerates the decrease of the total residual energy in the thermal model. The choice of the 100th and 200th iterations for measuring the total residual energy in the residual feedback accelerator 18 is efficient for analysis of thermal models of integrated circuit packages, but other numbers can be used. The present invention teaches the measurement of the total residual energy after a first number of iterations and after a second number of iterations and that the two values for the total residual energy be compared. The empirically derived constant by which the difference between total residual energy measurements is multiplied is derived by performing a Gauss-Seidel iteration analysis a number of times and determining for what value the constant provides the most efficient analysis.

The data storage system 20 operates to store a representation of the resistor network thermal model. The data storage system 20 also stores the results from the Gauss-Seidel processor 12. The data storage system 20 provides the results of the Gauss-Seidel processor 12 to the display 22. The display 22 is operable to represent both the resistor network thermal model and the results from the Gauss-Seidel processor 12. Thus, the thermal analysis system 10 operates to analyze a resistor network thermal model of an object and display the results on the display 22.

Figure 2:
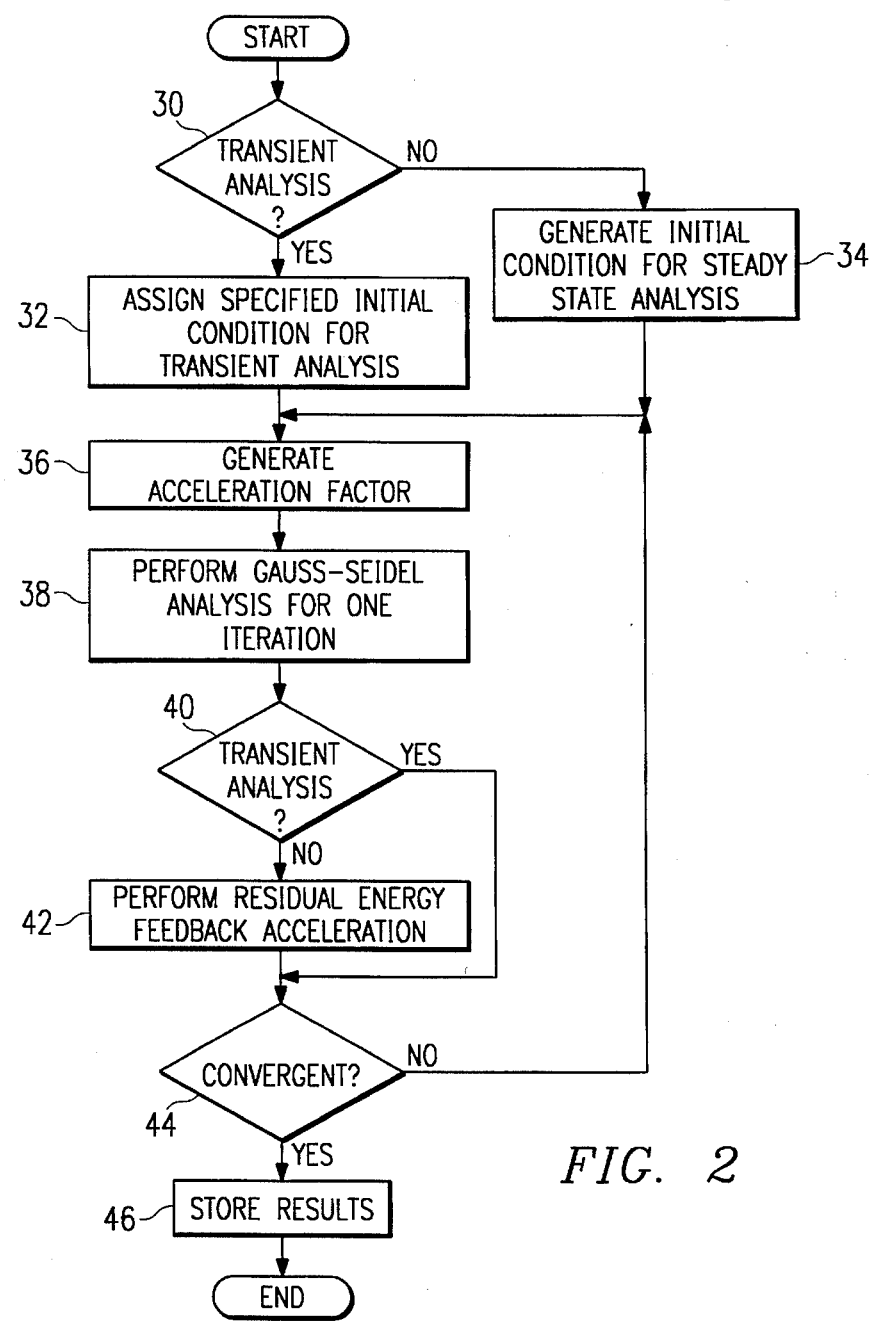
FIG. 2 illustrates a flow chart of a method for analyzing a thermal model of an object according to the teachings of the present invention.

FIG. 2 illustrates a method for analyzing a thermal model of an object according to the teachings of the present invention. Step 30 is a decision step asking whether the analysis is a transient analysis. If the analysis is a transient analysis, step 32 is performed. In step 32, the specified initial conditions for the transient analysis are assigned. In one embodiment of the present invention, the initial conditions include boundary conditions and the initial temperatures of the nodes in a resistor network thermal model. If the analysis is a steady state analysis, step 34 is performed. In step 34, an initial condition for a steady state analysis is generated. The initial condition generated is the optimal initial temperature for each node in a resistor network thermal model. One embodiment of the present invention generates the initial condition for steady state analysis according to the process illustrated in FIG. 3.

After either step 32 or 34, an acceleration factor is generated in step 36. In one embodiment of the present invention, the acceleration factor generated in step 36 is generated according to formula (8) described above. According to the teachings of the present invention, the acceleration factor varies periodically between a lower-value and an upper-value based upon the number of iterations performed in a Gauss-Seidel iteration analysis. A technical advantage of the present invention is a decrease in the processing time necessary for a Gauss-Seidel iteration analysis due to the use of the described acceleration factor. This advantage is not limited to an analysis of a thermal model but extends to any Gauss-Seidel based analysis.

One iteration in a Gauss-Seidel iteration analysis utilizing the acceleration factor is performed in step 38. The Gauss-Seidel iteration analysis operates according to equations (1), (2), (3) and (4) described above. The analysis utilizes the acceleration factor generated in step 36 according to equation (7) described above to accelerate the Gauss-Seidel iteration analysis. Only one iteration is performed in step 38. In step 38, new values for the temperatures at each node in the model are calculated based upon the Gauss-Seidel iteration analysis using the acceleration factor generated in step 36.

Step 40 asks whether the analysis is a transient analysis. If the analysis is not a transient analysis, residual energy feedback acceleration is performed in step 42. If the analysis is a transient analysis, step 42 is skipped and step 44 is performed.

Figure 4:
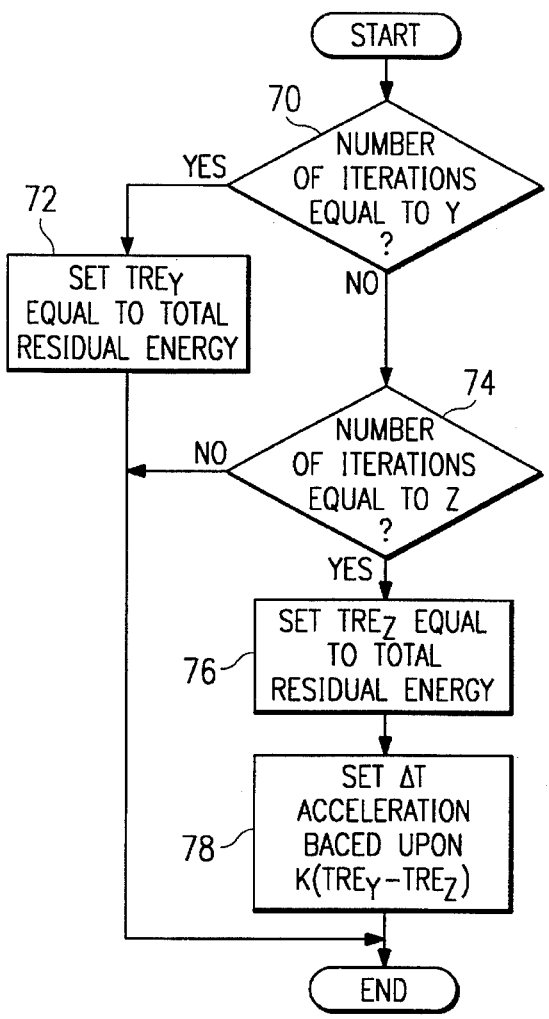
FIG. 4 illustrates a flow chart of a process used to perform residual energy feedback acceleration for a steady state analysis.

In step 42, residual energy feedback acceleration is performed according to the process illustrated in FIG. 4. Residual energy feedback acceleration measures the total residual energy after a first number of iterations and after a second number of iterations. Residual energy feedback acceleration utilizes the difference between the two total residual energy measurements to provide a global temperature delta to accelerate the analysis. In one embodiment of the present invention, the global temperature delta is calculated according to equation (9) as described above.

Step 44 determines whether the analysis is convergent. The analysis is convergent if the temperature at each node resulting from the last iteration is different from the temperature at that node resulting from the previous iteration by less than a selected constant. The equations that describe convergence are equations (5) and (6) described above. If the analysis is not convergent, the method continues with step 36 and a new acceleration factor is generated. If the analysis is convergent, the results are stored in step 46. The results comprise the temperature value of each node in the resistor network thermal model.

Figure 3:
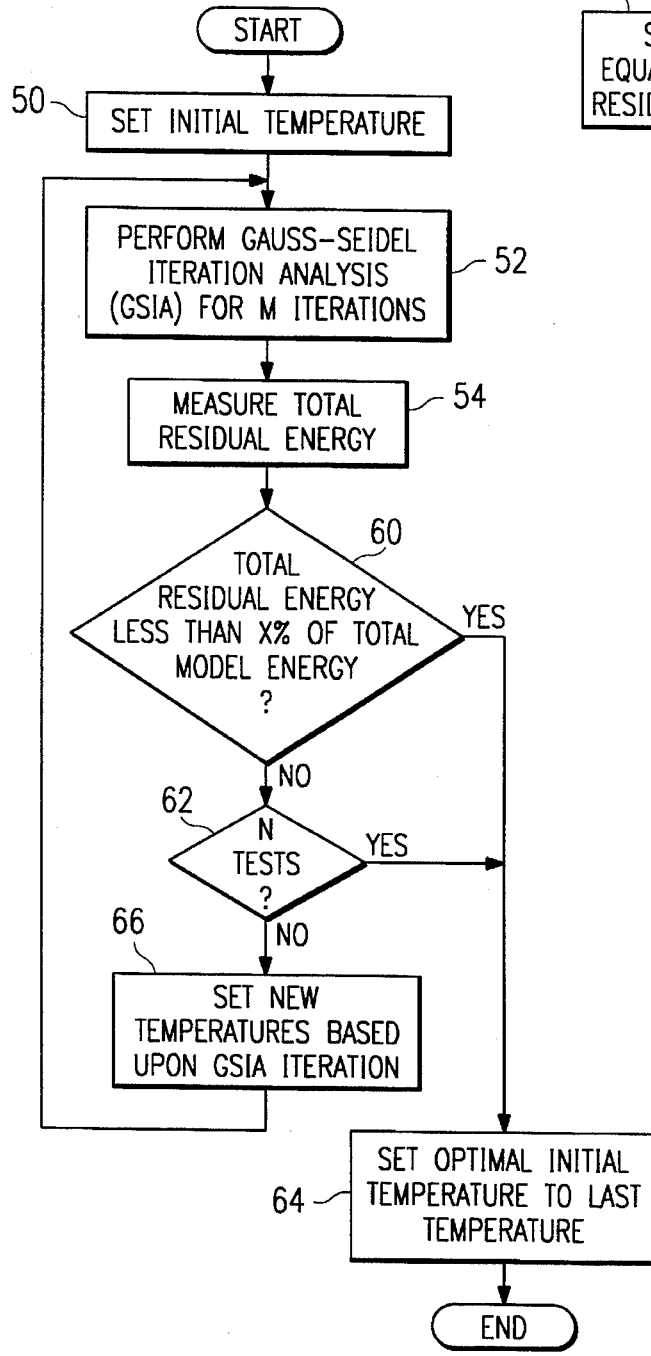
FIG. 3 illustrates a flow chart of the process used to generate an initial condition for a steady state analysis.

FIG. 3 illustrates a flow chart of the process for generating an initial condition for steady state analysis. In step 50, an initial temperature is set for each node in the resistor network thermal model. The initial temperature for each node can constitute any temperature value. In one embodiment of the present invention, the initial temperature is set to twenty-five degrees Celsius. A number of iterations equal to M of a Gauss-Seidel iteration analysis are performed in step 52. The value of M can be set to any suitable number. In one embodiment of the present invention, the value of M is equal to one hundred. In step 54, the total residual energy in the model after the last iteration is measured.

Step 60 decides whether the total residual energy is less than X percent of the total model energy. The value of X can be set to any suitable number. In one embodiment of the present invention, X is equal to ten. If the total residual energy is more than X percent of the initial total energy, the process continues to step 62. If the total residual energy is less than X percent of the total model energy, the process continues to step 64. Step 52, step 54 and step 60 comprise a test which may be performed one or more times.

Step 62 asks whether N tests have been performed. The number N can be set to any suitable number. In one embodiment of the present invention, N is set to ten. If N tests have been performed, the process continues to step 64. In step 64, the optimal initial temperatures of the nodes in the thermal model are set to the last temperatures resulting from the last iteration of the Gauss-Seidel iteration analysis. If N tests have not been performed, the process continues to step 66.

In step 66, new temperatures for the nodes in the thermal model are set based upon the result of the last iteration of the Gauss-Seidel iteration analysis. After step 66, the process returns to step 52, and another M iterations are performed. Thus, the process illustrated in FIG. 3 continues until either the total residual energy is less than X percent of the total model energy after a test or N tests have been performed. After either of these conditions, the last node temperatures are returned as the optimal initial temperatures for the nodes in the thermal model.

FIG. 4 illustrates the process for performing residual energy feedback acceleration. Step 70 asks whether the number of iterations performed in the Gauss-Seidel iteration analysis of step 38 of the method illustrated in FIG. 2 is equal to Y. The value of Y can be any suitable number, but in one embodiment of the present invention, Y is set to one hundred. If the number of iterations is equal to Y, the value of $TRE_y$ is set equal to the value of the total residual energy of the thermal model. $TRE_y$ represents the total residual energy after Y iterations in the Gauss-Seidel iteration analysis. If the number of iterations is not equal to Y, the process continues to step 74.

The process asks in step 74 whether the number of iterations is equal to Z. The value of Z can be set to any suitable number, in one embodiment of the present invention Z is set to equal two hundred. If the number of iterations equals Z, then $TRE_z$ is set equal to the total residual energy in step 76. $TRE_z$ represents the total residual energy after Z iterations in the Gauss-Seidel iteration analysis.

Step 78 sets a global temperature delta for acceleration of the Gauss-Seidel iteration analysis based upon a constant K multiplied by the difference between $TRE_y$ and $TRE_z$. The constant K can be any suitable value. In one embodiment of the present invention, the constant K has been derived empirically to be 0.08 for the most efficient analysis.

Thus, the process illustrated in FIG. 4 measures the total residual energy after Y iterations and measures the total residual energy after Z iterations of the method illustrated in FIG. 2. Based upon the measurements of the total residual energy, the method of FIG. 4 sets a global temperature delta to be used by the method of FIG. 2 to accelerate the Gauss-Seidel iteration analysis. The global temperature delta is utilized to modify the temperature of every node in the thermal model.

A technical advantage of the present invention is a dramatic decrease in the amount of processing time required for a Gauss-Seidel iteration analysis of a thermal model of an object. According to the teachings of the present invention, (1) the generation of an initial condition for steady state analysis, (2) the generation of a periodic acceleration factor, and (3) the performance of residual energy feedback acceleration, greatly decrease the processing time required by a thermal analysis system. Under one set of specific conditions, the reduction of processing time for a steady state analysis can decrease the total processing time from 12 hours to a processing time of 10 minutes.

Although the present invention has been described in detail, it should be understood that the various changes, substitutions and alterations can be made hereto without departing from the spirit and scope of the present invention as defined by the appended claims.

What is claimed is:

1. A thermal analysis system for analyzing a thermal model of an object, comprising:

a Gauss-Seidel processor operable to analyze a resistor network thermal model of an object by performing a Gauss-Seidel iteration analysis, wherein the Gauss-Seidel processor uses an acceleration factor and performs a plurality of iterations to transform a first set of data defining a first plurality of temperatures for a plurality of nodes in the resistor network thermal model into a second set of data defining a second plurality of temperatures for the plurality of nodes;

an acceleration factor generator coupled to the Gauss-Seidel processor, the acceleration factor generator operable to generate a value for the acceleration factor for each of said iterations performed by the Gauss-Seidel processor and operable to provide the value for the acceleration factor to the Gauss-Seidel processor, wherein the value generated for the acceleration factor varies periodically between a lower-value and an upper-value responsive to a number of said iterations performed by the Gauss-Seidel processor.

2. The thermal analysis system of claim 1, wherein the value generated for the acceleration factor varies periodically between said lower-value and said upper-value according to a cosine function of the number of iterations performed by the Gauss-Seidel processor.

3. The thermal analysis system of claim 1, wherein the value generated for the acceleration factor varies periodically between a value of 1.01 and a value of 1.96 according to a cosine function of the number of iterations performed by the Gauss-Seidel processor.

4. The thermal analysis system of claim 1, wherein the thermal analysis system further comprises an initial condition generator coupled to the Gauss-Seidel processor, the initial condition generator operable to generate an optimal initial temperature for the resistor network thermal model for a steady state analysis.

5. The thermal analysis system of claim 1, wherein the thermal analysis system further comprises an initial condition generator coupled to the Gauss-Seidel processor, the initial condition generator operable to perform a number of iterations of a Gauss-Seidel iteration analysis of the resistor network thermal model and operable to provide a result of the number of iterations of the Gauss-Seidel iteration analysis as an optimal initial temperature for a steady state analysis.

6. The thermal analysis system of claim 1, wherein the thermal analysis system further comprises a residual energy feedback accelerator coupled to the Gauss-Seidel processor, the residual energy feedback accelerator operable to provide a global temperature delta for a steady state analysis.

7. The thermal analysis system of claim 1, wherein the thermal analysis system further comprises a residual energy feedback accelerator coupled to the Gauss-Seidel processor, the residual energy feedback accelerator operable to measure a first total residual energy after a first number of iterations by the Gauss-Seidel processor, to measure a second total residual energy after a second number of iterations by the Gauss-Seidel processor, and to provide a global temperature delta proportional to a difference between the first total residual energy and the second total residual energy.

8. A computer system for analyzing a thermal model of an integrated circuit package, comprising:

a data storage system operable to tore a plurality of data values, wherein a first set of data in the plurality of data values comprises a resistor network thermal model of the integrated circuit package, and wherein a second set of data in the plurality of data values comprises a result of an analysis of the resistor network thermal model;

a Gauss-Seidel processor coupled to the data storage system, the Gauss-Seidel processor operable to analyze the resistor network thermal model of the integrated circuit package by performing a Gauss-Seidel iteration analysis, and operable to provide the result of the analysis to the data storage system, wherein the Gauss-Seidel processor uses an acceleration factor and performs a plurality of iterations to transform the first set of data into the second set of data;

an acceleration factor generator coupled to the Gauss-Seidel processor, the acceleration factor generator operable to generate a value for the acceleration factor for each of the iterations performed by the Gauss-Seidel processor, and operable to provide the value for the acceleration factor to the Gauss-Seidel processor, wherein the value generated for the acceleration factor varies between a lower-value and an upper-value responsive to a number of the iterations performed by the Gauss-Seidel processor; and a display coupled to the Gauss-Seidel processor, wherein the display is operable to represent the plurality of data provided by the data storage.

9. The computer system of claim 8, wherein the value generated for the acceleration factor varies periodically between said lower-value and said upper-value according to a cosine function of the number of iterations performed by the Gauss-Seidel processor.

10. The computer system of claim 8, wherein the value generated for the acceleration factor varies periodically between a value of 1.01 and a value of 1.96 according to a cosine function of the number of iterations performed by the Gauss-Seidel processor.

11. The computer system of claim 8, wherein computer system further comprises an initial condition generator coupled to the Gauss-Seidel processor, the initial condition generator operable to generate an optimal initial temperature for the resistor network thermal model for a steady state analysis.

12. The computer system of claim 8, wherein computer system further comprises an initial condition generator coupled to the Gauss-Seidel processor, the initial condition generator operable to perform a number of the iterations of a Gauss-Seidel iteration analysis of the resistor network thermal model and operable to provide a result of the number of iterations of the Gauss-Seidel iteration analysis as an optimal initial temperature for a steady state analysis.

13. The computer system of claim 8, wherein computer system further comprises a residual energy feedback accelerator coupled to the Gauss-Seidel processor, the residual energy feedback accelerator operable to provide a global temperature delta for a steady state analysis.

14. The computer system of claim 8, wherein computer system further comprises a residual energy feedback accelerator coupled to the Gauss-Seidel processor, the residual energy feedback accelerator operable to measure a first total residual energy after a first number of the iterations by the Gauss-Seidel processor, to measure a second total residual energy after a second number of the iterations by the Gauss-Seidel processor, and to provide a global temperature delta proportional to a difference between the first total residual energy and the second total residual energy.

* * * * *